United States Patent
Gabriel et al.

(10) Patent No.: US 11,078,362 B2
(45) Date of Patent: *Aug. 3, 2021

(54) POLYAMIDE COMPOSITION CONTAINING A POLYAMIDE AND AN ADDITIVE

(71) Applicant: BASF SE, Ludwigshafen am Rhein (DE)

(72) Inventors: Claus Gabriel, Griesheim (DE); Simon Gramlich, Hirschberg (DE); Rainer Ostermann, Recklinghausen (DE); Florian Richter, Mannheim (DE); Raphael Dabbous, Riehen (CH); Thomas Meier, Mannheim (DE); Wolfgang Schrof, Neuleiningen (DE)

(73) Assignee: BASF SE, Ludwigshafen am Rhein (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/999,324

(22) PCT Filed: Feb. 16, 2017

(86) PCT No.: PCT/EP2017/053526
§ 371 (c)(1),
(2) Date: Aug. 17, 2018

(87) PCT Pub. No.: WO2017/140795
PCT Pub. Date: Aug. 24, 2017

(65) Prior Publication Data
US 2019/0071568 A1  Mar. 7, 2019

(30) Foreign Application Priority Data
Feb. 19, 2016 (EP) .................... 16156545

(51) Int. Cl.
| C08L 77/06 | (2006.01) |
| C08K 5/3465 | (2006.01) |
| C08K 5/357 | (2006.01) |
| C08K 5/46 | (2006.01) |
| B29C 64/153 | (2017.01) |
| B33Y 70/00 | (2020.01) |
| C09B 67/02 | (2006.01) |
| C08L 77/02 | (2006.01) |

(52) U.S. Cl.
CPC ............ *C08L 77/06* (2013.01); *B29C 64/153* (2017.08); *B33Y 70/00* (2014.12); *C08K 5/3465* (2013.01); *C08K 5/357* (2013.01); *C08K 5/46* (2013.01); *C08L 77/02* (2013.01); *C09B 67/0097* (2013.01)

(58) Field of Classification Search
None
See application file for complete search history.

(56) References Cited

U.S. PATENT DOCUMENTS

| 3,368,992 A | 2/1968 | Altermatt |
| 3,446,782 A | 5/1969 | Okazaki et al. |
| 3,720,650 A | 3/1973 | Schultze et al. |
| 3,816,442 A | 6/1974 | Mueller |
| 4,334,056 A | 6/1982 | Meyer et al. |
| 5,527,877 A | 6/1996 | Dickens, Jr. et al. |
| 5,733,497 A | 3/1998 | McAlea et al. |
| 5,932,687 A | 8/1999 | Baumann et al. |
| 6,136,948 A | 10/2000 | Dickens, Jr. et al. |
| 6,245,281 B1 | 6/2001 | Scholten et al. |
| 6,395,809 B1 | 5/2002 | Hayashi et al. |
| 9,428,610 B2 | 8/2016 | Diekmann et al. |
| 2004/0138363 A1* | 7/2004 | Baumann ............ C08K 3/22 524/413 |
| 2006/0108567 A1 | 5/2006 | Charati et al. |
| 2012/0329932 A1 | 12/2012 | Mathieu et al. |
| 2013/0012643 A1 | 1/2013 | Monsheimer et al. |
| 2013/0052453 A1 | 2/2013 | Filou et al. |
| 2018/0009944 A1 | 1/2018 | Gramlich et al. |
| 2018/0009950 A1 | 1/2018 | Gramlich et al. |
| 2018/0072868 A1 | 3/2018 | Richter et al. |
| 2018/0201758 A1 | 7/2018 | Richter et al. |

FOREIGN PATENT DOCUMENTS

| CA | 3012952 A1 | 8/2017 |
| CA | 3013565 A1 | 8/2017 |
| CA | 3014262 A1 | 8/2017 |
| CH | 549622 A | 5/1974 |
| CN | 103597033 A | 2/2014 |
| DE | 1089929 B | 9/1960 |
| DE | 1494563 A1 | 7/1969 |
| DE | 2458347 A1 | 6/1976 |
| DE | 2906647 B1 | 4/1980 |
| EP | 0863174 A1 | 9/1998 |

(Continued)

OTHER PUBLICATIONS

International Search Report for PCT/EP2017/053481 dated May 17, 2017.
International Search Report for PCT/EP2017/053491 dated May 23, 2017.
International Search Report for PCT/EP2017/053500 dated May 31, 2017.
International Search Report for PCT/EP2017/053526 dated May 15, 2017.
Written Opinion of the International Searching Authority for PCT/EP2017/053481 dated May 17, 2017.
Written Opinion of the International Searching Authority for PCT/EP2017/053491 dated May 23, 2017.
Written Opinion of the International Searching Authority for PCT/EP2017/053500 dated May 31, 2017.

(Continued)

*Primary Examiner* — Robert T Butcher
(74) *Attorney, Agent, or Firm* — Faegre Drinker Biddle & Reath LLP

(57) ABSTRACT

The present invention relates to a polyamide composition (PC) which comprises at least one polyamide (P) and at least one additive (A). The present invention further relates to the use of the polyamide composition (PC) in a selective laser sintering process, in an injection molding process, for producing molded articles and in an extrusion process.

9 Claims, 1 Drawing Sheet

(56) References Cited

FOREIGN PATENT DOCUMENTS

| | | |
|---|---|---|
| EP | 0911142 A1 | 4/1999 |
| EP | 2404955 A1 | 1/2012 |
| EP | 2543701 A1 | 1/2013 |
| JP | 49-127709 A | 12/1974 |
| JP | 06-202330 A | 7/1994 |
| JP | 11-509485 A | 8/1999 |
| JP | 2012-251148 A | 12/2012 |
| JP | 2017-014388 A | 1/2017 |
| WO | WO-9606881 A2 | 3/1996 |
| WO | WO-2012041793 A1 | 4/2012 |
| WO | WO-2015140016 A1 | 9/2015 |
| WO | WO-2016113241 A1 | 7/2016 |
| WO | WO-2017140764 A1 | 8/2017 |
| WO | WO-2017140773 A1 | 8/2017 |
| WO | WO-2017140779 A1 | 8/2017 |

OTHER PUBLICATIONS

Written Opinion of the International Searching Authority for PCT/EP2017/053526 dated May 15, 2017.

International Preliminary Report on Patentability received for PCT Patent Application No. PCT/EP2017/053526, dated May 18, 2018, 17 pages. (5 pages of English Translation and 12 pages of Original Document).

International Search Report and Written Opinion received for PCT Patent Application No. PCT/EP2017/053526, dated May 15, 2017, 10 pages. (2 pages of English Translation and 8 pages of Original Document).

Leong et al.: "Characterization of a poly-e-caprolactone polymeric drug delivery device built by selective laser sintering", Bio-Medical Materials and Engineering 17 (2007), 147-157.

* cited by examiner

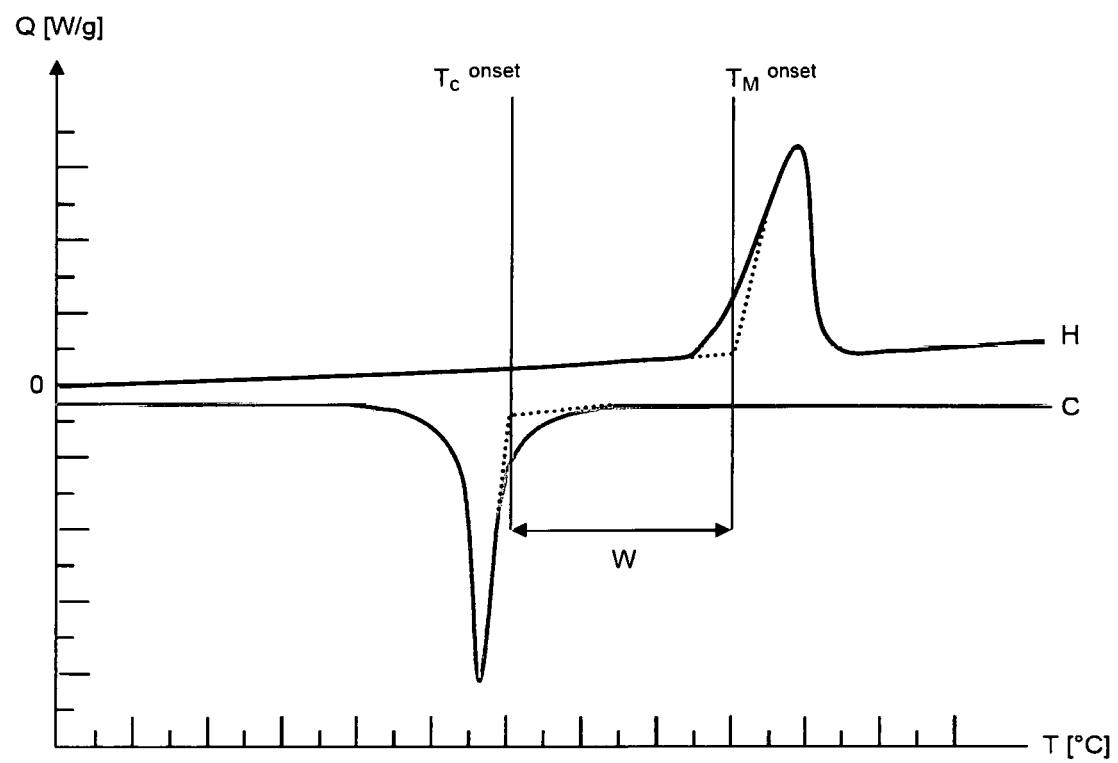

POLYAMIDE COMPOSITION CONTAINING A POLYAMIDE AND AN ADDITIVE

CROSS-REFERENCE TO RELATED APPLICATIONS

This application is a national stage application (under 35 U.S.C. § 371) of PCT/EP2017/053526, filed Feb. 16, 2017, which claims benefit of European Application No. 16156545.2, filed Feb. 19, 2016, both of which are incorporated herein by reference in their entirety.

The present invention relates to a polyamide composition (PC) which comprises at least one polyamide (P) and at least one additive (A). The present invention further relates to the use of the polyamide composition (PC) in a selective laser sintering process, in an injection molding process, for producing molded articles and in an extrusion process.

The rapid provision of prototypes is an object often pursued in recent times. One process which is particularly suitable for this so-called "rapid prototyping" is selective laser sintering. Here, a plastic is selectively irradiated with a laser beam in a chamber, the powder melts, the molten particles coalesce and resolidify. Repeated application of plastic powder and the subsequent irradiation with a laser facilitates modeling of three-dimensional molded articles.

However, not all plastic powders are suitable for use in a selective laser sintering process. Often used plastic powders are polyamides. However, some of these polyamides exhibit increased shrinkage or even warpage during selective laser sintering as a result of which the obtained components can be used or subjected to further processing only with difficulty.

Due to their high chemicals resistance and due to their good mechanical properties the use of polyamides as pulverulent coating media for producing paint-like coverings on metals is also known. Coating is effected here for example by fluidized-bed sintering processes, flame spray processes or electrostatic coating processes.

Preference is given here to polyamide powders having a narrow grain size distribution, a round shape and a smooth surface. Polyamide powders having the abovementioned properties are readily fluidizable and thus particularly well-suited for coating processes.

There is therefore a need for providing polyamide compositions suitable for example as coating media and for use in a selective laser sintering process.

The object addressed by the present invention is accordingly that of providing a novel polyamide composition. The polyamide composition should in particular be suitable for producing molded articles.

This object is achieved by a polyamide composition (PC) which comprises at least one polyamide (P) and at least one additive (A), wherein the at least one additive (A) is selected from compounds of general formula (I)

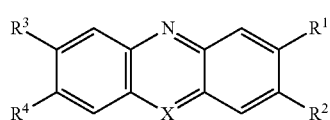

(I)

in which
$R^1$ and $R^3$ are independently of one another selected from the group consisting of H, $C_1$- to $C_{10}$-alkyl and $NR^5R^6$, wherein $R^5$ and $R^6$ are independently of one another selected from the group consisting of H and $C_1$- to $C_{10}$-alkyl;
$R^2$ and $R^4$ are independently of one another selected from the group consisting of H, $C_1$- to $C_{10}$-alkyl and $NR^7R^8$, wherein
$R^7$ and $R^8$ are independently of one another selected from the group consisting of H and $C_1$- to $C_{10}$-alkyl;
X represents N, $O^+$ or $S^+$;
wherein the compounds of general formula (I) have a positive charge when X represents $O^+$ or $S^+$ and the compounds of general formula (I) then comprise an anion $Y^-$,
wherein
$Y^-$ is selected from the group consisting of hydroxide, chloride, bromide, iodide, sulfate, sulfite, phosphate and phosphite.

It has been found that, surprisingly, a polyamide composition (PC) which comprises at least one polyamide (P) and at least one additive (A) is suitable for use in a selective laser sintering process. The molded articles produced with the polyamide composition (PC) exhibit markedly reduced warpage, if any.

It has also been found that, surprisingly, the polyamide composition (PC) according to the invention is suitable for use in the selective laser sintering process, in injection molding processes and in extrusion processes. The thus-produced molded articles exhibit improved colorfastness.

Another advantage is that when it is employed in a selective laser sintering process the polyamide composition (PC) can be reused. The polyamide composition (PC) not melted during the selective laser sintering has similarly advantageous sintering properties as during the first sintering cycle even after a plurality of laser sintering cycles.

The polyamide composition (PC) according to the invention is more particularly elucidated hereinbelow.

Polyamide Composition (PC)

According to the invention the polyamide composition (PC) comprises at least one polyamide (P) and at least one additive (A).

In the context of the present invention "at least one polyamide (P)" is to be understood as meaning either precisely one polyamide (P) or else a mixture of two or more polyamides (P).

The same applies for "at least one additive (A)". In the context of the present invention "at least one additive (A)" is to be understood as meaning either precisely one additive (A) or else a mixture of two or more additives (A).

The polyamide composition (PC) may comprise the at least one polyamide (P) and the at least one additive (A) in any desired amounts. It is preferable when the polyamide composition (PC) comprises in the range from 95 to 99.9 wt % of the at least one polyamide (P) and in the range from 0.1 to 5 wt % of the at least one additive (A) based on the sum of the weight percentages of the at least one polyamide (P) and at least one additive (A), preferably based on the total weight of the polyamide composition (PC).

It is particularly preferable when the polyamide composition (PC) comprises in the range from 97.5 to 99.5 wt % of the at least one polyamide (P) and in the range from 0.5 to 2.5 wt % of the at least one additive (A) in each case based on the sum of the weight percentages of the at least one polyamide (P) and of the at least one additive (A), preferably based on the total weight of the polyamide composition (PC).

It is most preferable when the polyamide composition (PC) comprises in the range from 99 to 99.5 wt % of the at least one polyamide (P) and in the range from 0.5 to 1 wt % of the at least one additive (A) in each case based on the sum of the weight percentages of the at least one polyamide (P) and of the at least one additive (A), preferably based on the total weight of the polyamide composition (PC).

The present invention accordingly also provides a polyamide composition (PC) where the polyamide composition (PC) comprises in the range from 95 to 99.9 wt % of the at least one polyamide (P) and in the range from 0.1 to 5 wt % of the at least one additive (A) in each case based on the sum of the weight percentages of the at least one polyamide (P) and of the at least one additive (A).

The polyamide composition (PC) may be present in any desired form. It is preferable when the polyamide composition (PC) is present in the form of a powder. It is especially preferable when the polyamide composition (PC) is present as a powder having a particle size in the range from 1 to 200 µm, more preferably in the range from 10 to 150 µm and most preferably in the range from 20 to 120 µm.

The present invention thus also provides a polyamide composition (PC) where the polyamide composition (PC) is present as a powder having a particle size in the range from 1 to 200 µm.

It is preferable when the polyamide composition (PC) has
a D10 value in the range from 10 to 30 µm
a D50 value in the range from 25 to 70 µm and
a D90 value in the range from 50 to 150 µm.

It is particularly preferable when the polyamide composition (PC) has
a D10 value in the range from 10 to 30 µm
a D50 value in the range from 40 to 60 µm and
a D90 value in the range from 80 to 100 µm.

In the context of the present invention "D10 value" is in this connection to be understood as meaning the particle size at which 10 vol % of the particles based on the total volume of the particles are smaller than or equal to the D10 value and 90 vol % of the particles based on the total volume of the particles are larger than the D10 value. By analogy, "D50 value" is to be understood as meaning the particle size at which 50 vol % of the particles based on the total volume of the particles are smaller than or equal to the D50 value and 50 vol % of the particles based on the total volume of the particles are larger than the D50 value. By analogy, "D90 value" is to be understood as meaning the particle size at which 90 vol % of the particles based on the total volume of the particles are smaller than or equal to the D90 value and 10 vol % of the particles based on the total volume of the particles are larger than the D90 value.

To determine particle sizes the polyamide composition (PC) is suspended in a dry state using compressed air or in a solvent, for example water or ethanol, and the suspension analyzed. Determination of the D10, D50 and D90 value is by laser diffraction using a Malvern Mastersizer 2000 with evaluation by Mie theory and Fraunhofer approximation.

The polyamide composition (PC) may comprise further additives (fA) in addition to the at least one polyamide (P) and the at least one additive (A).

The polyamide composition (PC) may comprise for example in the range from 0.1 to 60 wt % of further additives (fA) based on the total weight of the polyamide composition (PC). It is preferable when the polyamide composition (PC) comprises in the range from 0.25 to 40 wt % of further additives (fA), especially preferably in the range from 0.3 to 30 wt %, in each case based on the total weight of the polyamide composition (PC).

The present invention thus also provides a polyamide composition (PC) where the polyamide composition (PC) comprises in the range from 0.1 to 60 wt % of further additives (fA) based on the total weight of the polyamide composition (PC).

It will be appreciated that when the polyamide composition (PC) comprises further additives (fA) the wt % values of the at least one polyamide (P) present in the polyamide composition (PC) are correspondingly reduced so that the sum of the wt % values of the at least one polyamide (P), of the at least one additive (A) and of the further additives (fA) sum to 100%.

When the polyamide composition (PC) comprises further additives (fA) the polyamide composition comprises for example in the range from 35 to 99.8 wt % of the at least one polyamide (P), in the range from 0.1 to 5 wt % of the at least one additive (A) and in the range from 0.1 to 60 wt % of the further additives (fA) in each case based on the sum of the weight percentages of the at least one polyamide (P), of the at least one additive (A) and of the further additives (fA), preferably based on the total weight of the polyamide composition (PC).

It is preferable when the polyamide composition (PC) comprises in the range from 57.5 to 99.0 wt % of the at least one polyamide (P), in the range from 0.5 to 2.5 wt % of the at least one additive (A) and in the range from 0.25 to 40 wt % of the further additives (fA) in each case based on the sum of the weight percentages of the at least one polyamide (P), of the at least one additive (A) and of the further additives (fA), preferably based on the total weight of the polyamide composition (PC).

It is most preferable when the polyamide composition (PC) comprises in the range from 69 to 99.2 wt % of the at least one polyamide (P), in the range from 0.5 to 1 wt % of the at least one additive (A) and in the range from 0.3 to 30 wt % of the further additives (fA) in each case based on the sum of the weight percentages of the at least one polyamide (P), of the at least one additive (A) and of the further additives (fA), preferably based on the total weight of the polyamide composition (PC).

The wt % values of the at least one polyamide (P) present in the polyamide composition (PC), of the at least one additive (A) and of the optionally present further additives (fA) thus typically sum to 100%.

Suitable further additives (fA) are known per se to those skilled in the art. The further additives (fA) are preferably selected from the group consisting of stabilizers, dyes, pigments, fillers, reinforcers, impact modifiers and plasticizers.

The present invention thus also provides a polyamide composition (PC) which comprises further additives (fA), wherein the further additives (fA) are selected from the group consisting of stabilizers, dyes, pigments, fillers, reinforcers, impact modifiers and plasticizers.

Suitable stabilizers are for example phenol, talc, alkaline earth metal silicates, sterically hindered phenols, phosphites and alkaline earth metal glycerophosphates.

Suitable dyes and pigments are for example transition metal oxides or nigrosins.

Suitable filers are for example glass beads, glass fibers, kaolin, wollastonite, muscovite, phlogopite, carbon fibers, carbon nanotubes and chalk.

Suitable impact modifiers are for example polymers based on ethylene propylene (EPM) or ethylene propylene diene (EPDM) rubbers or thermoplastic urethanes and also ionomers or styrene-based rubbers.

Polyamide (P)

Suitable polyamides (P) generally have a viscosity number of 70 to 350 ml/g, preferably of 70 to 240 ml/g. The viscosity number is determined according to the invention from a 0.5 wt % solution of the polyamide (P) in 96 wt % sulfuric acid at 25° C. according to ISO 307.

Preferred polyamides (P) are semicrystalline polyamides. Suitable polyamides (P) have a weight-average molecular weight ($M_w$) in the range from 500 to 2 000 000 g/mol, preferably in the range from 5000 to 500 000 g/mol and particularly preferably in the range from 10 000 to 100 000 g/mol. The weight-average molecular weight ($M_w$) is determined according to ASTM D4001.

Suitable polyamides (P) include for example polyamides (P) which derive from lactams having 7 to 13 ring members. Suitable polyamides (P) further include polyamides (P) obtained by reaction of dicarboxylic acids with diamines.

Examples of polyamides (P) which derive from lactams include polyamides which derive from polycaprolactam, polycaprylolactam and/or polylaurolactam.

Suitable polyamides (P) further include those obtainable from ω-aminoalkyl nitriles. A preferred ω-aminoalkylnitrile is aminocapronitrile which results in polyamide 6. Furthermore, dinitriles may be reacted with diamine. Preference is given here to adipodinitrile and hexamethylenediamine which polymerize to afford polyamide 66. The polymerization of nitriles is effected in the presence of water and is also known as direct polymerization.

When polyamides (P) obtainable from dicarboxylic acids and diamines are used, dicarboxylic acid alkanes (aliphatic dicarboxylic acids) having 6 to 36 carbon atoms, preferably 6 to 12 carbon atoms and particularly preferably 6 to 10 carbon atoms may be employed. Aromatic dicarboxylic acids are also suitable.

Examples of dicarboxylic acids include adipic acid, azelaic acid, sebacic acid, dodecanedioic acid and also terephthalic acid and/or isophthalic acid.

Suitable diamines include for example alkanediamines having 4 to 36 carbon atoms, preferably alkanediamines having 6 to 12 carbon atoms, in particular alkanediamines having 6 to 8 carbon atoms, and aromatic diamines, for example m-xylylenediamine, di(4-aminophenyl)methane, di(4-aminocyclohexyl)methane, 2,2-di(4-aminophenyl)propane, 2,2-di(4-aminocyclohexyl)propane and 1,5-diamino-2-methylpentane.

Preferred polyamides (P) are polyhexamethylene adipamide, polyhexamethylene sebacamide and polycaprolactam and also copolyamide 6/66, in particular having a proportion of caprolactam units of 5 to 95 wt %.

Also suitable are polyamides (P) obtainable by copolymerization of two or more of the monomers mentioned hereinabove and hereinbelow or mixtures of a plurality of polyamides (P) in any desired mixing ratio. Particularly preferred mixtures are mixtures of polyamide 66 with other polyamides (P), in particular copolyamide 6/66.

Suitable polyamides (P) are accordingly aliphatic, semiaromatic or aromatic polyamides (P). The term "aliphatic polyamides" is to be understood as meaning that the polyamides (P) are constructed exclusively from aliphatic monomers. The term "semiaromatic polyamides" is to be understood as meaning that the polyamides (P) are constructed from both aliphatic and aromatic monomers. The term "aromatic polyamides" is to be understood as meaning that the polyamides (P) are constructed exclusively from aromatic monomers.

The nonexhaustive list which follows comprises the abovementioned, and further, polyamides (P) suitable for use in the process according to the invention and the monomers present.

AB Polymers:
PA 4 pyrrolidone
PA 6 ε-caprolactam
PA 7 enantholactam
PA 8 caprylolactam
PA 9 9-aminopelargonic acid
PA 11 11-aminoundecanoic acid
PA 12 laurolactam
AA/BB Polymers:
PA 46 tetramethylenediamine, adipic acid
PA 66 hexamethylenediamine, adipic acid
PA 69 hexamethylenediamine, azelaic acid
PA 610 hexamethylenediamine, sebacic acid
PA 612 hexamethylenediamine, decanedicarboxylic acid
PA 613 hexamethylenediamine, undecanedicarboxylic acid
PA 1212 dodecane-1,12-diamine, decanedicarboxylic acid
PA 1313 tridecane-1,13-diamine, undecanedicarboxylic acid
PA 6T hexamethylenediamine, terephthalic acid
PA 9T nonyldiamine, terephthalic acid
PA MXD6 m-xylylenediamine, adipic acid
PA 6I hexamethylenediamine, isophthalic acid
PA 6-3-T trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 diaminodicyclohexylmethane, laurolactam
PA 6I/6T/PACM as PA 6I/6T and diaminodicyclohexylmethane
PA 12/MACMI laurolactam, dimethyldiaminodicyclohexylmethane, isophthalic acid
PA 12/MACMT laurolactam, dimethyldiaminodicyclohexylmethane, terephthalic acid
PA PDA-T phenylenediamine, terephthalic acid The present invention thus also provides a polyamide composition (PC) where the at least one polyamide (P) is selected from the group consisting of PA 4, PA 6, PA 7, PA 8, PA 9, PA 11, PA 12, PA 46, PA 66, PA 69, PA 510, PA 610, PA 612, PA 613, PA 1212, PA1313, PA 6T, PA MXD6, PA 6I, PA 6-3-T, PA 6/6T, PA 6/66, PA 66/6, PA 6/12, PA 66/6/610, PA 6/6T, PA PACM 12, PA 6/6T/PACM, PA 12/MACMI, PA 12/MACMT, PA PDA-T and copolyamides composed of two or more of the abovementioned polyamides.

It is preferable when the at least one polyamide (P) is selected from the group consisting of polyamide 6 (PA 6), polyamide 66 (PA 66), polyamide 6/66 (PA 6/66), polyamide 66/6 (PA 66/6), polyamide 610 (PA 610), polyamide 6/6T (PA 6/6T), polyamide 12 (PA12) and polyamide 1212 (PA1212).

Particularly preferred polyamides (P) are polyamide 6 (PA 6) and/or polyamide 66 (PA 66), polyamide 6 (PA 6) being especially preferred.

The present invention thus also provides a polyamide composition (PC) where the at least one polyamide (P) is selected from the group consisting of polyamide 6 (PA 6), polyamide 66 (PA 66), polyamide 6/66 (PA 6/66), polyamide 66/6 (PA 66/6), polyamide 610 (PA 610), polyamide 6/6T (PA 6/6T), polyamide 12 (PA12) and polyamide 1212 (PA1212).

Additive (A)

In accordance with the invention the at least one additive (A) is selected from compounds of general formula (I) in which $R^1$ and $R^3$ are independently of one another selected from the group consisting of H, $C_1$- to $C_{10}$-alkyl and $NR^5R^6$, wherein
R⁵ and R⁶ are independently of one another selected from the group consisting of H and C₁- to C₁₀-alkyl;
R² and R⁴ are independently of one another selected from the group consisting of C₁- to C₁₀-alkyl and NR⁷R⁸, wherein
R⁷ and R⁸ are independently of one another selected from the group consisting of H and C₁- to C₁₀-alkyl;
X represents N, O⁺ or S⁺;
wherein the compounds of general formula (I) have a positive charge when X represents O⁻ or S⁺ and the compounds of general formula (I) then comprise an anion Y⁻,
wherein
Y⁻ is selected from the group consisting of hydroxide, chloride, bromide, iodide, sulfate, sulfite, phosphate and phosphite.

It will be appreciated by those skilled in the art that when the compounds of general formula (I) have a positive charge the anion Y⁻ present in formula (I) generally cancels out the positive charge. This means for example that when the compound of general formula (I) has a positive charge and the anion Y⁻ is chloride the positive charge of general formula (I) and the negative charge of the anion Y⁻ mutually cancel out. When the compound of general formula (I) has a positive charge and the anion Y⁻ is for example phosphate the anion carries a triple negative charge. One of the charges cancels out the positive charge of the compound of general formula (I), the remaining two negative charges cancel out the positive charges of further compounds of general formula (I). This is known to those skilled in the art.

It is preferable when the substituents of the compounds of general formula (I) are defined as follows:
R¹ and R³ are independently of one another selected from the group consisting of H and C₁- to C₅-alkyl;
R² and R⁴ are independently of one another selected from the group consisting of C₁- to C₅-alkyl and NR⁷R⁸, wherein
R⁷ and R⁸ are independently of one another selected from the group consisting of H and C₁- to C₅-alkyl;
X represents N or S⁺;
wherein the compounds of general formula (I) have a positive charge when X represents S⁺ and the compounds of general formula (I) then comprise an anion Y⁻,
wherein
Y⁻ is selected from the group consisting of hydroxide, chloride, bromide, iodide.

The present invention thus also provides a polyamide composition (PC) in which the substituents of the compounds of general formula (I) are defined as follows:
R¹ and R³ are independently of one another selected from the group consisting of H and C₁- to C₅-alkyl;
R² and R⁴ are independently of one another selected from the group consisting of C₁- to C₅-alkyl and NR⁷R⁸, wherein
R⁷ and R⁸ are independently of one another selected from the group consisting of H and C₁- to C₅-alkyl;
X is N or S⁺,
wherein the compounds of general formula (I) have a positive charge when X represents S⁺ and the compounds of general formula (I) then comprise an anion Y⁻,
wherein
Y⁻ is selected from the group consisting of hydroxide, chloride, bromide and iodide.

In the context of the present invention hydroxide is to be understood as meaning OH⁻, chloride as meaning Cl⁻, bromide as meaning Br⁻, iodide as meaning I⁻, sulfate as meaning $SO_4^{2-}$, sulfite as meaning $SO_3^{2-}$, phosphate as meaning $PO_4^{3-}$ and phosphite as meaning $PO_3^{3-}$.

C₁- to C₁₀-alkyl is to be understood as meaning saturated and unsaturated, preferably saturated, hydrocarbons having a free valence (free radical) and from 1 to 10 carbon atoms. The hydrocarbons may be linear or cyclic, preferably linear. They may likewise comprise a cyclic component and a linear component. Examples of such alkyl groups are methyl, ethyl, n-propyl, n-butyl, hexyl and cyclohexyl. Corresponding remarks also apply for C₁- to C₅-alkyl.

It is particularly preferable when the at least one additive (A) is selected from the group consisting of compounds of formula (II) and of formula (III).

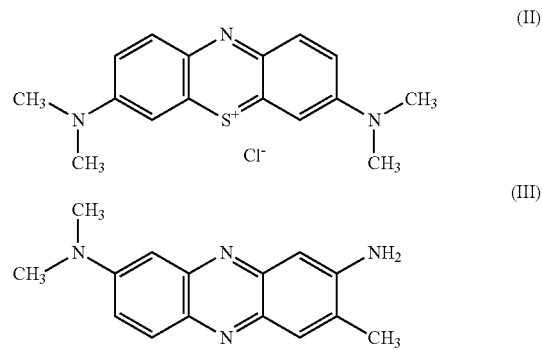

The compound of formula (II) is a dye also known as methylene blue. Other names are N,N,N',N'-tetramethylenethionine chloride and basic blue 9 (color index 52015; CAS number 61-73-4/122965-43-9 (hydrate)).

The compound of formula (III) is a dye also known as neutral red. Neutral red is also known by the name 3-amino-7-dimethylamino-2-methylphenazine hydrochloride/tolylene red (color index 50040; CAS number 553-24-2).

It is thus particularly, preferable when the at least one additive is selected from the group consisting of neutral red and methylene blue.

The present invention thus also provides a polyamide composition (PC) in which the at least one additive (A) present is selected from the group consisting of neutral red and methylene blue.

Production of the Polyamide Composition (PC)

The polyamide composition (PC) may be produced by any method known to those skilled in the art.

It is preferably produced by compounding or by precipitation.

Processes for compounding and for precipitation are known to those skilled in the art.

For example the at least one polyamide (P), the at least one additive (A) and optionally the further additives (fA) may be compounded in an extruder and subsequently extruded therefrom, optionally with subsequent extrudate pelletization.

After compounding the at least one polyamide (P), the at least one additive (A) and optionally the further additives (fA) may be ground to obtain the polyamide composition (PC) in the form of a powder. Processes for grinding the polyamide composition (PC) are known per se to those skilled in the art. For example the polyamide composition (PC) may be introduced into a mill and ground therein.

Suitable mills include all mills known to those skilled in the art, for example classifier mills, opposed jet mills, hammer mills, ball mills, vibratory mills and rotor mills.

The grinding in the mill may likewise be effected by any method known to those skilled in the art, for example grinding may take place under inert gas and/or under cooling with liquid nitrogen. Cooling under liquid nitrogen is preferred.

The temperature during grinding is freely choosable. Grinding is preferably performed at temperatures of liquid nitrogen, for example at a temperature in the range from −210° C. to −195° C.

When the polyamide composition (PC) is produced by precipitation, typically the at least one polyamide (P) is mixed with a solvent (S) and the at least one polyamide (P) is dissolved in the solvent (S) optionally with heating to obtain a polyamide solution (PS). The polyamide (P) may be partly or fully dissolved in the solvent (S). The polyamide (P) is preferably fully dissolved in the solvent (S). It is thus preferable to obtain a polyamide solution (PS) which comprises the at least one polyamide (P) fully dissolved in the solvent (S). The at least one additive (A) and optionally the further additives (fA) are added to the mixture of the at least one polyamide (P) and the solvent (S). The point in time of the addition of the at least one additive (A) and optionally of the further additives (fA) is unimportant. However, the addition is generally effected before the precipitation of the polyamide composition (PC). The at least one additive (A) and optionally the further additives (fA) may be added to the solvent (S) before the at least one polyamide (P) is mixed with the solvent (S). It is likewise possible to add the at least one additive (A) and optionally the further additives (fA) to the mixture of the at least one polyamide (P) and the solvent (S) before the at least one polyamide (P) is dissolved in the solvent (S). It is likewise possible to add the at least one additive (A) and optionally the further additives (fA) to the polyamide solution (PS).

The polyamide solution (PS) typically comprises the at least one additive (A) in dissolved form. The at least one additive (A) may be present in the polyamide solution (PS) in fully dissolved form but the at least one additive A) may likewise be present in the polyamide solution (PS) in partly dissolved form. The at least one additive (A) is preferably present in the polyamide solution (PS) in fully dissolved form.

The further additives (fA) may be present in the polyamide solution (PS) in partly or fully dissolved form. They may likewise be present in the polyamide solution (PS) in suspended form. When the further additives (fA) are present in the polyamide solution (PS) in suspended form, the polyamide solution (PS) forms the dispersion medium (continuous phase) and the further additives (fA) form the disperse phase. It will be appreciated that it is also possible for a portion of the further additives (fA) to be present in the polyamide solution (PS) in dissolved form and a further portion of the further additives (fA) to be present in the polyamide solution (PS) in suspended form.

The polyamide composition (PC) may subsequently be precipitated out of the polyamide solution (PS) which comprises the at least one additive (A) and optionally further additives (fA).

The precipitation may be effected by any method known to those skilled in the art. Thus the polyamide composition (PC) may for example be precipitated by cooling the polyamide solution (PS) which comprises the at least one additive (A) and optionally the further additives (fA), by distillative removal of the solvent (S) from the polyamide solution (PS) which comprises the at least one additive (A) and optionally the further additives (fA) or by addition of a precipitating agent (PA) to the polyamide solution (PS) which comprises the at least one additive (A) and optionally the further additives (fA). The polyamide composition (PC) is preferably precipitated by cooling the polyamide solution (PS) which comprises the at least one additive (A).

The solvent (S) used may be precisely one solvent. It is likewise possible to use two or more solvents as the solvent (S). Suitable solvents (S) are for example selected from the group consisting of alcohols, lactams and ketones. The solvent (S) is preferably selected from the group consisting of alcohols and lactams.

In accordance with the invention "lactam" is to be understood as meaning generally cyclic amides having 3 to 12 carbon atoms, preferably 4 to 6 carbon atoms, in the ring. Suitable lactams are for example selected from the group consisting of propio-3-lactam (β-lactam; β-propiolactam), butyro-4-lactam (γ-lactam; γ-butyrolactam), 2-piperidinone (δ-lactam; δ-valerolactam), hexano-6-lactam (ε-lactam; ε-caprolactam), heptano-7-lactam (ζ-lactam; ζ-heptanolactam), octano-8-lactam (η-lactam; η-octanolactam), nonano-9-lactam (θ-lactam; θ-nonanolactam), decano-10-lactam (ω-decanolactam), undecano-11-lactam (ω-undecanolactam) and dodecano-12-lactam (ω-dodecanolactam).

The lactams may be unsubstituted or at least monosubstituted. When at least monosubstituted lactams are employed the nitrogen atom and/or the ring carbon atoms thereof may bear one, two, or more substituents independently of one another selected from the group consisting of $C_1$- to $C_{10}$-alkyl, $C_5$- to $C_6$-cycloalkyl, and $C_5$- to $C_{10}$-aryl.

Suitable $C_1$- to $C_{10}$-alkyl substituents are for example methyl, ethyl, propyl, isopropyl, n-butyl, sec-butyl, and tert-butyl. A suitable $C_5$- to $C_6$-cycloalkyl substituent is for example cyclohexyl. Preferred $C_5$- to $C_{10}$-aryl substituents are phenyl and anthranyl.

It is preferable to employ unsubstituted lactams, γ-lactam (γ-butyrolactam), δ-lactam (δ-valerolactam) and ε-lactam (ε-caprolactam) being preferred. Particular preference is given to δ-lactam (δ-valerolactam) and ε-lactam (ε-caprolactam), ε-caprolactam being especially preferred.

The solvent (S) preferably comprises at least 20 wt % of lactam, particularly preferably at least 25 wt % of lactam, especially preferably at least 30 wt % of lactam and most preferably at least 40 wt % of lactam in each case based on the total weight of the solvent (S).

It is furthermore most preferable when the solvent (S) consists of lactam.

It is also preferable when the solvent (S) comprises less than 80 wt % of water, particularly preferably less than 75 wt % of water, especially preferably less than 70 wt % of water and most preferably less than 60 wt % of water in each case based on the total weight of the solvent (S).

The lower limit of the water content of the solvent (S) is generally in the range from 0 to 0.5 wt %, preferably in the range from 0 to 0.3 wt %, particularly preferably in the range from 0 to 0.1 wt %, in each case based on the total weight of the solvent (S).

The at least one polyamide (P) may be dissolved in the solvent (S) at any desired temperature. The at least one polyamide (P) is preferably dissolved in the solvent (S) with heating. The temperature during dissolution is for example in the range from 80° C. to 200° C., preferably in the range from 90° C. to 190° C. and especially preferably in the range from 120° C. to 180° C.

When the precipitation of the polyamide composition (PC) out of the polyamide solution (PS) which comprises the at least one additive (A) and optionally the further additives (fA) is effected by cooling, the polyamide solution (PS) which comprises at least one additive (A) and optionally further additives (fA) may be cooled by any method known to those skilled in the art. The polyamide solution (PS) which comprises the at least one additive (A) and optionally the further additives (fA) may be cooled to any desired temperature. The polyamide solution (PS) which comprises the at least one additive (A) and optionally the further additives (fA) is preferably cooled to a temperature in the range from 20° C. to 80° C., particularly preferably in the range from 20° C. to 75° C.

It will be appreciated that the temperature to which the polyamide solution (PS) which comprises the at least one additive (A) and optionally the further additives (fA) is cooled is below the temperature at which the polyamide (P) is dissolved in the solvent (S).

When the polyamide composition (PC) is precipitated by cooling of the polyamide solution (PS) which comprises the at least one additive (A) and optionally the further additives (fA), the polyamide solution (PS) may for example be stirred during cooling to produce particularly fine particles of the polyamide composition (PC).

In accordance with the invention the polyamide composition (PC) comprises the at least one polyamide (P) and also the at least one additive (A) and optionally further additives (fA). The polyamide composition (PC) may comprise the at least one polyamide (P) in addition to the at least one additive (A) and the optionally further additives (fA). It is likewise possible for the at least one polyamide (P) to be at least partly coated with the at least one additive (A) and optionally the further additives (fA).

Typically, the polyamide (P) is then initially dissolved in the solvent (S) to obtain a solution. The dissolution may be effected by any method known to those skilled in the art, for example as described hereinabove, it being preferable, however, not to add the at least one additive (A). The polyamide (P) is subsequently precipitated out of the solution and dried to obtain a powder of the polyamide (P). Suitable methods of precipitation include al methods known to those skilled in the art, for example those previously described for the polyamide solution (PS).

The obtained powder of the polyamide (P) is then contacted with a solution of the at least one additive (A) and subsequently dried to obtain the sintering powder (SP). All solvents known to those skilled in the art which dissolve the at least one additive (A) and preferably have only poor, if any, solubility for the polyamide (P), for example water and/or alcohols, are suitable as the solvent in the solution of the at least one additive (A). All methods known to those skilled in the art are suitable for contacting the powder of the polyamide (P) with the solution of the at least one additive (A). The contacting is typically effected at temperatures in the range from 10 to 30° C.

Use of the Polyamide Composition (PC)

The polyamide composition (PC) according to the invention may be used for producing molded articles.

The present invention thus also provides for the use of the polyamide composition (PC) according to the invention for producing molded articles.

The molded articles may be produced by any process known to those skilled in the art. For example by a selective laser sintering process, an injection molding process or by an extrusion process. These methods are known per se to the person skilled in the art.

The present invention thus also provides for the use of the polyamide composition (PC) according to the invention in an injection molding process.

The present invention further provides for the use of the polyamide composition (PC) according to the invention in an extrusion process.

The polyamide composition (PC) according to the invention may be employed in any extrusion process known to those skilled in the art. For example for producing semifinished products, films or in blow molding.

The present invention therefore also provides for the use of the polyamide composition (PC) according to the invention in a blow molding process.

The present invention further provides for the use of the polyamide composition (PC) according to the invention in an extrusion process for producing semifinished products.

The present invention also provides for the use of the polyamide composition (PC) according to the invention in a film extrusion process.

The present invention also provides for the use of the polyamide composition (PC) according to the invention in a selective laser sintering process.

The process of selective laser sintering is known per se to those skilled in the art and described for example in U.S. Pat. No. 6,136,948 and WO 96/06881.

In laser sintering a first layer of a sinterable powder is arranged in a powder bed and briefly locally irradiated with a laser beam. Only the portion of the sinterable powder irradiated by the laser beam is selectively melted (selective laser sintering). The molten sinterable powder coalesces and thus forms a homogeneous melt in the irradiated region. The region subsequently cools down again and the sinterable powder resolidifies. The powder bed is then lowered by the layer thickness of the first layer, a second layer of the sinterable powder is applied, selectively irradiated and melted with the laser. This joins the upper second layer of the sinterable powder with the lower first layer; the particles of the sinterable powder within the second layer are also joined to one another by the melting. Repeating the lowering of the powder bed, the application of the sinterable powder and the melting of the sinterable powder makes it possible to produce three-dimensional molded articles. The selective irradiation of certain locations with the laser beam makes it possible to produce molded articles also having cavities for example. An additional support material is not necessary since the unmolten sinterable powder itself acts as a support material.

All powders known to those skilled in the art and meltable by irradiation with a laser are suitable as sinterable powder in the selective laser sintering. According to the invention the polyamide composition (PC) is employed as the sinterable powder in the selective laser sintering.

The polyamide composition (PC) is then used as sintering powder which may also be referred to as sinterable powder.

The present invention therefore also provides for the use of the polyamide composition (PC) according to the invention as sintering powder.

Suitable lasers for selective laser sintering are known to those skilled in the art and include for example fiber lasers, Nd:YAG lasers (neodymium-doped yttrium aluminum garnet laser) and carbon dioxide lasers.

Of particular importance in the selective laser sintering process is the melting range of the sinterable powder, the so-called "sintering window (W)". When the sinterable powder is the polyamide composition (PC) according to the invention the sintering window (W) is referred to in the context of the present invention as "sintering window $(W_{SP})$" of the polyamide composition (PC). When the sinterable powder is the at least one polyamide (P) present in the polyamide composition (PC) the sintering window (W) is referred to in the context of the present invention as "sintering window ($W_P$)" of the at least one polyamide (P).

The sintering window (W) of a sinterable powder may for example be determined by differential scanning calorimetry, DSC.

In differential scanning calorimetry the temperature of a sample, in the present case a sample of the sinterable powder, and the temperature of a reference are changed linearly with time. To this end heat is supplied to/removed from the sample and the reference. The amount of heat Q necessary to keep the sample at the same temperature as the reference is determined. The amount of heat $Q_R$ supplied to/removed from the reference serves as a reference value.

If the sample undergoes an endothermic phase change an additional amount of heat Q must be supplied to keep the sample at the same temperature as the reference. If an exothermic phase change takes place an amount of heat Q must be removed to keep the sample at the same temperature as the reference. The measurement affords a DSC diagram in which the amount of heat Q supplied to/removed from the sample is plotted as a function of temperature T.

Measurement typically involves initially performing a heating run (H), i.e. the sample and the reference are linearly heated. During the melting of the sample (solid/liquid phase change) an additional amount of heat Q must be supplied to keep the sample at the same temperature as the reference. The DSC diagram then exhibits a peak, the so-called melting peak.

A cooling run (C) is typically measured subsequently to the heating run (H). Here, the sample and the reference are linearly cooled, i.e. heat is removed from the sample and the reference. During crystallization/solidification of the sample (liquid/solid phase change) a larger amount of heat Q must be removed to keep the sample at the same temperature as the reference since heat is liberated during crystallization/solidification. The DSC diagram of the cooling run (C) then exhibits a peak, the so-called crystallization peak, in the opposite direction to the melting peak.

Such a DSC diagram comprising a heating run (H) and a cooling run (C) is depicted by way of example in FIG. 1. The DSC diagram can be used to determine the onset temperature of melting ($T_M^{onset}$) and the onset temperature of crystallization ($T_C^{onset}$).

To determine the onset temperature of melting ($T_M^{onset}$) a tangent is placed against the baseline of the heating run (H) that plots the temperatures below the melting peak. A second tangent is placed against the first point of inflection of the melting peak which is at temperatures below the temperature at the maximum of the melting peak. The two tangents are extrapolated until they intersect. The vertical extrapolation of the intersection on the temperature axis denotes the onset temperature of melting ($T_C^{onset}$).

To determine the onset temperature of crystallization ($T_C^{onset}$) a tangent is plotted against the baseline of the cooling run (C) that plots the temperatures above the crystallization peak. A second tangent is placed against the point of inflection of the crystallization peak which is at temperatures above the temperature at the minimum of the crystallization peak. The two tangents are extrapolated until they intersect. The vertical extrapolation of the intersection on the temperature axis denotes the onset temperature of crystallization ($T_C^{onset}$).

The sintering window (W) is the difference between the onset temperature of melting ($T_M^{onset}$) and the onset temperature of crystallization ($T_C^{onset}$). Thus:

$$W = T_M^{onset} - T_C^{onset}.$$

In the context of the present invention the terms "sintering window (W)", "magnitude of the sintering window (W)" and "difference between the onset temperature of melting ($T_M^{onset}$) and the onset temperature of crystallization ($T_C^{onset}$)" have identical meanings and are used synonymously.

Determination of the sintering window ($W_{SP}$) of the polyamide composition (PC) and determination of the sintering window ($W_P$) of the at least one polyamide (P) is effected as described hereinabove. Determination of the sintering window ($W_{SP}$) of the polyamide composition (PC) then uses the polyamide composition (PC) as the sample and determination of the sintering window ($W_P$) of the at least one polyamide (P) uses the at least one polyamide (P) as the sample.

EXAMPLES

The following components were employed:
Polyamide (P):
 (P1) Polyamide 12 (PA 2200, EOS)
 (P2) Polyamide 6 (Ultramid® B27; BASF SE)
Additive (A)
 (A1) Neutral red (3-amino-7-dimethylamino-2-methylphenazine hydrochloride; Carl Roth, Fluka, Alfa Aesar)
Production of the Sintering Powder Table 1 indicates whether the sintering powder was produced by precipitation or by grinding.

For the sintering powders produced by grinding the components reported in table 1 were compounded in the ratio reported in table 1 in a twin-screw extruder (ZSK 40) at 200 rpm, a barrel temperature of 240° C. and a throughput of 50 kg/h with subsequent extrudate pelletization. The thus obtained pelletized material was subjected to cryogenic grinding to obtain the sintering powder (SP).

To produce the sintering powder by precipitation the polyamide (P) was dissolved in the amounts reported in table 1 in a solvent consisting of 40 wt % of caprolactam and 60 wt % of water in each case based on the total weight of the solvent using a temperature ramp of 2 hours at 120° C., 2 hours at 160° C. and 0.5 hour at 175° C. and subsequently precipitated by cooling. After washing with water and drying, the polyamide (P) was obtained as a powder. The thus obtained powder of the polyamide (P) was subsequently contacted with a solution of the additive (A), the polyamide (P) and the additive (A) being employed in the ratio reported in table 1. The solvent employed in the solution of the additive (A) was water. After drying the sintering powder (SP) was obtained.

TABLE 1

| Example | (P1) [wt %] | (P2) [wt %] | (A1) [wt %] | Production |
|---|---|---|---|---|
| C1 | 100 | — | — | — |
| C2 | — | 100 | — | grinding |
| C3 | | 100 | | precipitation |
| E4 | — | 99.875 | 0.125 | precipitation |
| E5 | | 99.5 | 0.5 | precipitation |

The onset temperature of melting ($T_M^{onset}$) and the onset temperature of crystallization ($T_C^{onset}$) of the sintering powder were determined as described for FIG. 1. The sintering window (W) was determined therefrom.

Tensile bars were also produced to determine warpage.

Production of Tensile Bars

The sintering powders were introduced with a layer thickness of 0.1 mm into the construction space at the temperature reported in table 2. The sintering powder was subsequently irradiated with a laser with the laser power output reported in table 2 and the reported point spacing, wherein the speed of the laser over the sample during irradiation was as reported in table 2. The point spacing is also known as laser track spacing or lane spacing. In selective laser sintering scanning is typically effected in stripes. The point spacing denotes the distance between the centers of the stripes, i.e. between the two centers of the laser beam of two stripes.

TABLE 2

| Example | Temperature [° C.] | Laser power output [W] | Laser speed [m/s] | Point spacing [mm] |
|---|---|---|---|---|
| C1 | 171 | 11 | 5 | 0.15 |
| C2 | 209 | 18 | 5 | 0.2 |
| C3 | 201 | 23 | 5 | 0.2 |
| E4 | 201 | 18 | 5 | 0.15 |
| E5 | 208 | 15 | 5 | 0.15 |

Determination of Warpage

To determine the warpage of the obtained sintered bars the sintered bar was placed concave side down on a planar surface. The distance ($a_m$) between the planar surface and the upper edge of the middle of the sintered bar was then determined. The thickness ($d_m$) in the middle of the sintered bar was also determined. Warpage in % is then given by the following formula:

$$V = 100 \cdot (a_m - d_m)/d_m$$

The dimensions of the sintered bars were typically 80 mm in length, 10 mm in width and 4 mm in thickness.

The results for the measurement of the sintering window (W) and of warpage are reported in table 3.

TABLE 3

| Example | $T_m^{onset}$ [° C.] | $T_c^{onset}$ [° C.] | Sintering window W [K] | Warpage [%] |
|---|---|---|---|---|
| C1 | 178.7 | 152.5 | 26.2 | — |
| C2 | 207.4 | 190.7 | 10.7 | 50 |
| C3 | 214.1 | 188.8 | 25.3 | 20 |
| E4 | 213.2 | 181.3 | 31.9 | — |
| E5 | 211.5 | 175.6 | 35.9 | 5 |

It is clearly apparent from table 3 that the use of at least one additive (A) in the sintering powder (SP) results in a markedly widened sintering window. In addition, warpage is markedly reduced.

The invention claimed is:

1. A polyamide composition (PC) which comprises at least one polyamide (P) and at least one additive (A), wherein the at least one additive (A) is selected from compounds of general formula (I)

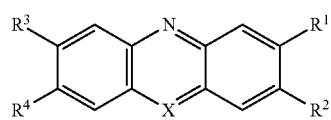

(I)

in which
R$^1$ and R$^3$ are independently of one another selected from the group consisting of H, C$_1$- to C$_{10}$-alkyl and NR$^5$R$^6$, wherein
R$^5$ and R$^6$ are independently of one another selected from the group consisting of H and C$_1$- to C$_{10}$-alkyl;
R$^2$ and R$^4$ are independently of one another selected from the group consisting of H, C$_1$- to C$_{10}$-alkyl and NR$^7$R$^8$, wherein
R$^7$ and R$^8$ are independently of one another selected from the group consisting of H and C$_1$- to C$_{10}$-alkyl;
X represents N, O$^+$ or S$^+$;
wherein the compounds of general formula (I) have a positive charge when X represents O$^+$ or S$^+$ and the compounds of general formula (I) then comprise an anion Y$^-$,
wherein
Y$^-$ is selected from the group consisting of hydroxide, chloride, bromide, iodide, sulfate, sulfite, phosphate and phosphite, wherein the polyamide composition (PC) is present in the form of a powder having a particle size in the range from 1 to 200 μm,
wherein the composition is a sintering powder; and wherein
the polyamide composition (PC) comprises in the range from 95 to 99.9 wt % of the at least one polyamide (P) and in the range from 0.1 to 5 wt % of the at least one additive (A) in each case based on the sum of the weight percentages of the at least one polyamide (P) and of the at least one additive (A);
wherein the polyamide composition has a D10 value in the range of from 10 to 30 μm.

2. The composition according to claim 1, wherein the at least one polyamide (P) present in the polyamide composition (PC) is selected from the group consisting of PA 4, PA 6, PA 7, PA 8, PA 9, PA 11, PA 12, PA 46, PA 66, PA 69, PA 510, PA 610, PA 612, PA 613, PA 1212, PA 1313, PA 6T, PA MXD6, PA 61, PA 6-3-T, PA 6/6T, PA 6/66, PA 66/6, PA 6/12, PA 66/6/610, PA 61/6T, PA PACM 12, PA 61/6T/PACM, PA 12/MACMI, PA 12/MACMT, PA PDA-T and copolyamides composed of two or more of the abovementioned polyamides.

3. The composition according to claim 1, wherein the at least one polyamide (P) present in the polyamide composition (PC) is selected from the group consisting of polyamide 6 (PA 6), polyamide 66 (PA 66), polyamide 6/66 (PA 6/66), polyamide 66/6 (PA 66/6), polyamide 610 (PA 610), polyamide 6/6T (PA 6/6T), polyamide 12 (PA12) and polyamide 1212 (PA1212).

4. The composition according to claim 1, wherein the substituents of the compounds of general formula (I) are defined as follows:
R$^1$ and R$^3$ are independently of one another selected from the group consisting of H and C$_1$- to C$_5$-alkyl;
R$^2$ and R$^4$ are independently of one another selected from the group consisting of C$_1$- to C$_5$-alkyl and NR$^7$R$^8$, wherein
R$^7$ and R$^8$ are independently of one another selected from the group consisting of H and C$_1$- to C$_5$-alkyl;
X is N or S$^+$,
wherein the compounds of general formula (I) have a positive charge when X represents S$^+$ and the compounds of general formula (I) then comprise an anion Y$^-$,
wherein
Y$^-$ is selected from the group consisting of hydroxide, chloride, bromide and iodide.

5. The composition according to claim 1, wherein the at least one additive (A) present in the polyamide composition (PC) is selected from the group consisting of neutral red and methylene blue.

6. The composition according to claim 1, wherein the polyamide composition (PC) comprises further additives (fA), wherein the further additives (fA) are selected from the group consisting of stabilizers, dyes, pigments, fillers, reinforcers, impact modifiers and plasticizers.

7. The composition according to claim 1, wherein the polyamide composition (PC) comprises in the range from 0.1 to 60 wt % of further additives (fA) based on the total weight of the polyamide composition (PC).

8. A method comprising selective laser sintering the polyamide composition (PC) according to claim 1.

9. A method comprising producing a molded article from the polyamide composition (PC) according to claim 1.

* * * * *